United States Patent
Liu (10) Patent No.: US 12,335,886 B2
(45) Date of Patent: Jun. 17, 2025

(54) ACCESS CONTROL METHOD AND APPARATUS, COMMUNICATION DEVICE, AND STORAGE MEDIUM

(71) Applicant: Beijing Xiaomi Mobile Software Co., Ltd., Beijing (CN)

(72) Inventor: Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 382 days.

(21) Appl. No.: 17/797,991

(22) PCT Filed: Feb. 14, 2020

(86) PCT No.: PCT/CN2020/075340
§ 371 (c)(1),
(2) Date: Aug. 5, 2022

(87) PCT Pub. No.: WO2021/159492
PCT Pub. Date: Aug. 19, 2021

(65) Prior Publication Data
US 2023/0075764 A1   Mar. 9, 2023

(51) Int. Cl.
*H04W 56/00* (2009.01)
*H04W 48/16* (2009.01)

(52) U.S. Cl.
CPC ......... *H04W 56/001* (2013.01); *H04W 48/16* (2013.01)

(58) Field of Classification Search
CPC .......................... H04W 56/001; H04W 48/16
See application file for complete search history.

(56) References Cited

U.S. PATENT DOCUMENTS

2019/0342819 A1   11/2019   Kadiri et al.
2021/0297999 A1*   9/2021   Kim ................. H04W 72/0453

FOREIGN PATENT DOCUMENTS

| CN | 110463258 A | 11/2019 |
| CN | 110602731 A | 12/2019 |

OTHER PUBLICATIONS

International Search Report of International Application No. PCT/CN2020/075340, mailed Nov. 9, 2020, 2 pages.

* cited by examiner

*Primary Examiner* — Diane D Mizrahi
(74) *Attorney, Agent, or Firm* — Finnegan, Henderson, Farabow, Garrett & Dunner, L.L.P (57) ABSTRACT

An access control method, includes: sending, by a base station, physical broadcast channel (PBCH) information of a synchronization signal block (SSB) carrying access indication information, wherein the access indication information indicates whether to allow access of first type user equipment, wherein a maximum operating bandwidth of the first type user equipment is smaller than an operating bandwidth of second type user equipment.

13 Claims, 4 Drawing Sheets

MIB: $\overline{a}_0, \overline{a}_1, \overline{a}_2, \overline{a}_3, \ldots, \overline{a}_{\overline{A}-1}$ Payload: $\overline{a}_{\overline{A}}, \overline{a}_{\overline{A}+1}, \overline{a}_{\overline{A}+2}, \overline{a}_{\overline{A}+3}, \ldots, \overline{a}_{\overline{A}+7}$

ACCESS CONTROL METHOD AND APPARATUS, COMMUNICATION DEVICE, AND STORAGE MEDIUM

CROSS-REFERENCE TO RELATED APPLICATION

The present application is the U.S. National phase application of International Application No. PCT/CN2020/075340, filed on Feb. 14, 2020, the entire content of which is incorporated herein by reference.

TECHNICAL FIELD

The present application relates to, but is not limited to, the field of wireless communications technologies, and in particular to an access control method and apparatus, a communication device and a storage medium.

BACKGROUND

At present, the 3rd Generation Partnership Project (3GPP) has carried out study on Reduced Capability NR Devices (REDCAP) for R17, with a goal of reducing the complexity of user equipment and saving costs in the case of coexistence with R15/16 user equipment.

User equipment of 5G NR Enhanced Mobile Broadband (eMBB) is required to support at least up to bandwidth of 100M. However, reduced capability NR devices not limited to 5G-based industrial sensors, video surveillance, wearable devices and the like are not required to support such large bandwidth, especially for those of the type of industrial sensors, which only require transmission bandwidth of a few megabytes. Such reduced capability NR devices may be classified into a new terminal type in enhancement of 5G subsequent releases, and technical characteristics will be improved correspondingly.

SUMMARY

In view of the above, the embodiments of the present disclosure provide access control methods, a communication device and a non-transitory storage medium.

According to the first aspect of the embodiments of the present disclosure, there is provided an access control method applied to a base station. The method includes: sending physical broadcast channel (PBCH) information of a synchronization signal block (SSB) carrying access indication information, where the access indication information is used for indicating whether to allow access of first type user equipment, a maximum operating bandwidth of the first type user equipment being less than an operating bandwidth of second type user equipment.

According to the second aspect of the embodiments of the present disclosure, there is provided an access control method applied to first type user equipment. The method includes: receiving PBCH information of a SSB carrying access indication information; and determining, according to an indication from the access indication information, whether to perform access, where a maximum operating bandwidth of the first type user equipment is less than an operating bandwidth of second type user equipment.

According to the third aspect of the embodiments of the present disclosure, there is provided a communication device including a processor, a transceiver, a memory and an executable program stored on the memory and runnable by the processor, where the processor, when running the executable program, performs a step of the access control method according to the first aspect or the second aspect.

According to the fourth aspect of the embodiments of the present disclosure, there is provided a non-transitory storage medium storing an executable program, where the executable program, when executed by a processor, implements a step of the access control method according to the first aspect or the second aspect.

It should be understood that the above general description and the following detailed description are only exemplary and illustrative and do not limit the embodiments of the present disclosure.

BRIEF DESCRIPTION OF THE DRAWINGS

The accompanying drawings, which are incorporated into and constitute a part of the description, illustrate embodiments consistent with the present disclosure, and are used to explain the principles of the embodiments of the present disclosure in conjunction with the description.

DETAILED DESCRIPTION

Embodiments will be described here in detail, examples of which are illustrated in the accompanying drawings. When the following description relates to the drawings, the same numerals in different drawings refer to the same or similar elements unless otherwise indicated. The implementations described in the embodiments below are not intended to represent all implementations consistent with this disclosure. Rather, they are only examples of devices and methods consistent with some aspects of the present disclosure as recited in the appended claims.

The terms used in the embodiments of the present disclosure are only for the purpose of describing particular embodiments, and are not intended to limit the embodiments of the present disclosure. "A", "the" and "this" in singular form used in the embodiments of the present disclosure and the appended claims are intended to include those in plural form as well, unless the context clearly dictates otherwise. It should also be understood that the term "and/or" as used herein refers to and includes any and all possible combinations of one or more of the associated listed items.

It should be understood that although the terms "first", "second", "third", and the like may be adopted in the embodiments of the present disclosure to describe various information, these information should not be limited to these terms. These terms are only used to distinguish the same type of information from each other. For example, without departing from the scope of the embodiments of the present disclosure, the first information may also be referred to as the second information, and similarly, the second information may also be referred to as the first information. The word "if" as used here can be interpreted as "during . . . " or "when . . . " or "in response to determining . . . " depending on the context.

Figure 1:
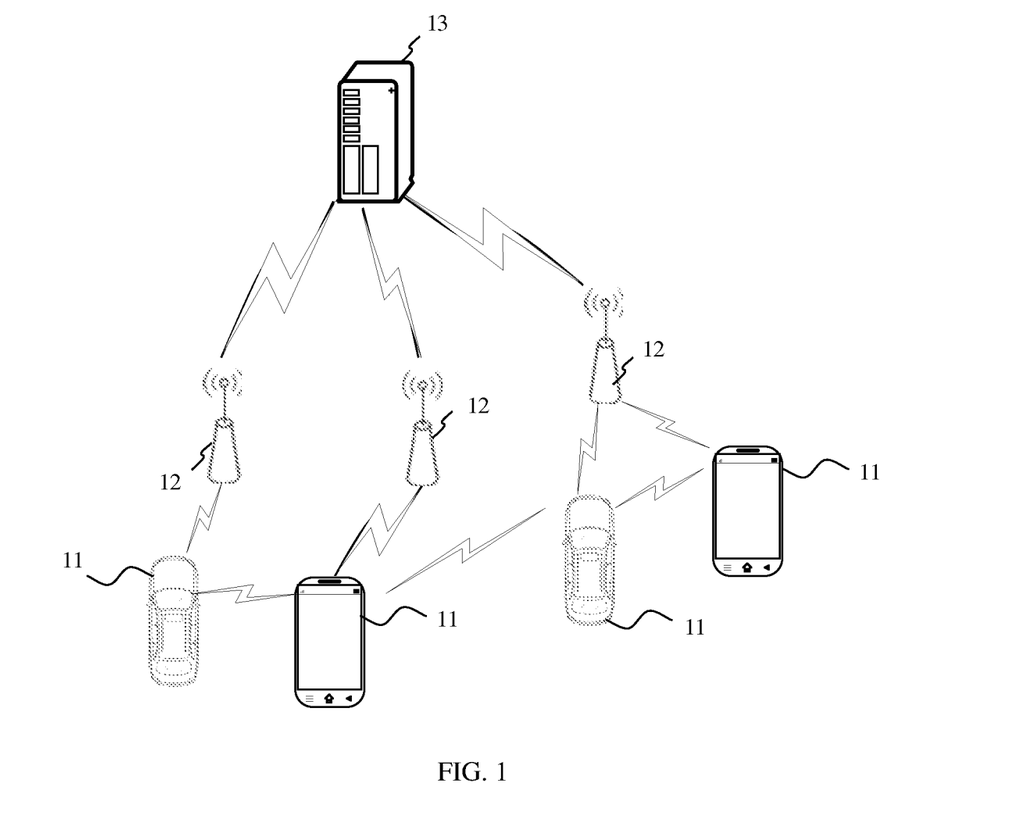
FIG. 1 is a structural schematic diagram of a communication system illustrated according to some embodiments.

Referring to FIG. 1, a structural schematic diagram of a wireless communication system provided by the embodiments of the present disclosure is illustrated. As shown in FIG. 1, the wireless communication system is a communication system based on cellular mobile communication technology, and the wireless communication system may include several terminals 11 and several base stations 12.

The terminal 11 may refer to a device that provides voice and/or data connectivity to a user. The terminal 11 may communicate with one or more core networks via Radio Access Network (RAN), and the terminal 11 may be an internet of things (IoT) terminal, for example, a sensor device, a mobile telephone (or referred to as a "cellular" telephone) and a computer with an internet of things terminal, or the terminal 11, for example, may be a fixed, portable, pocket-sized, hand-held, computer built-in or on-board apparatus. For example, it is a station (STA), a subscriber unit, a subscriber station, a mobile station, a mobile, a remote station, an access point, a remote terminal, an access terminal, a user terminal, a user agent, a user device or user equipment (UE). Alternatively, the terminal 11 may be an unmanned aerial vehicle device. Alternatively, the terminal 11 may be an on-board device, for example, which may be a vehicle computer with wireless communication function, or may be a wireless communication device of an external vehicle computer. Alternatively, the terminal 11 may be an infrastructure, for example, which may be a street light, a signal light, or other infrastructure with wireless communication function.

The base station 12 may be a network side device in the wireless communication system. The wireless communication system may be a 4th generation mobile communication (4G) technology system, also referred to as a Long Term Evolution (LTE) system; or, the wireless communication system may be a 5G system, also referred to as a new radio (NR) system or a 5G NR system. Alternatively, the wireless communication system may be a next generation system of the 5G system. An access network in the 5G system may be referred to as an NG-RAN (New Generation-Radio Access Network). Alternatively, it is a Machine Type Communication (MTC) system.

The base station 12 may be an evolved base station (eNB) adopted in the 4G system. Alternatively, the base station 12 may be a base station (gNB) with centralized distributed architecture in the 5G system. When adopting the centralized distributed architecture, the base station 12 usually includes a central unit (CU) and at least two distributed units (DUs). The central unit is provided with a protocol stack for a Packet Data Convergence Protocol (PDCP) layer, a Radio Link Control (RLC) protocol layer and a Media Access Control (MAC) layer. The distributed unit is provided with a physical (PHY) layer protocol stack. The specific implementations of the base station 12 are not limited by the embodiments of the present disclosure.

A wireless connection may be established between the base station 12 and the terminal 11 through a wireless air interface. In different implementations, the wireless air interface is a wireless air interface based on the 4th generation mobile communication (4G) network technology standard; or, the wireless air interface is a wireless air interface based on the 5th generation mobile communication (5G) network technology standard, for example, the wireless air interface is new radio; or, the wireless air interface may be a wireless air interface based on a mobile communication network technology standard for a next generation of 5G.

In some embodiments, the wireless communication system may further include a network management device 13.

Several base stations 12 are connected with the network management device 13, respectively. The network management device 13 may be a core network device in the wireless communication system, for example, the network management device 13 may be a mobility management entity (MME) in an Evolved Packet Core (EPC) network. Alternatively, the network management device may be other core network devices, for example, Serving GateWays (SGWs), Public Data Network GateWays (PGWs), Policy and Charging Rules Function (PCRF) units, Home Subscriber Servers (HSSs) or the like. The implementation forms of the network management device 13 are not limited by the embodiments of the present disclosure.

The executing body involved in the embodiments of the present disclosure includes, but is not limited to, user equipment such as an industrial sensor, a video surveillance, and a wearable device that uses 5G cellular mobile communication technologies for communication, and a base station and the like.

An application scenario of the embodiments of the present disclosure is that at present, a New Radio (NR) system is designed with a minimum bandwidth actually equal to the bandwidth for a common COntrol REsource SET (CORESET) of Remaining Minimum System Information (RMSI). In an initial access procedure, the user equipment reads Physical Broadcast Channel (PBCH) information after a synchronization signal of a Synchronization Signal and PBCH block (SSB) is found by the user equipment. Bandwidth of the SSB is fixed, and currently it is 15*12*20=3.6M for Subcarrier Spacing (SCS) of 15k. The PBCH information may indicates CORESET bandwidth of the RMSI, and the UE may find a corresponding PDCCH from the CORESET of the RMSI and then decodes a PDSCH. Therefore, the UE is required to support at least the CORESET bandwidth of the RMSI configured in the PBCH, the maximum configuration of which is currently 96 PRBs, i.e., close to 18M, and counting guard bandwidth, the UE is required to support at least the CORESET bandwidth of 20M.

For wearable 5G devices such as an industrial sensor, a watch and the like, such large bandwidth is not required, and only bandwidth of about 10M is required, however this is incompatible with an access procedure in R15/16.

The communication network system may support user equipment with large and small bandwidth simultaneously, but this poses a great challenge to operators and network planning. Some operators support it, while others may not, and access of reduced capability NR devices needs to be restricted.

Figure 2:
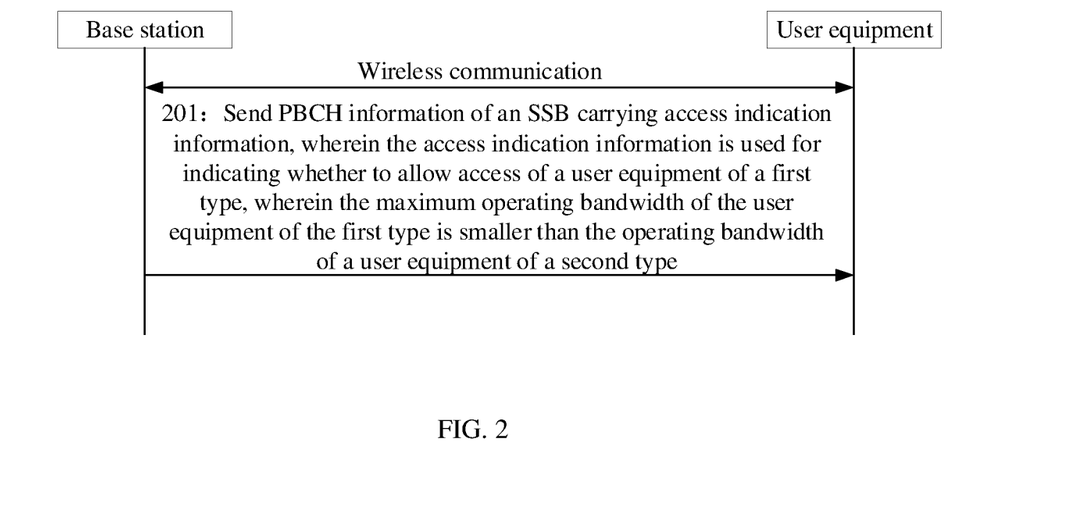
FIG. 2 is a schematic flow chart of an access control method illustrated according to some embodiments.

As shown in FIG. 2, an access control method is provided by the present embodiment and can be applied to the base station in the wireless communication. The access control method includes the following step.

Step 201, sending PBCH information of a SSB carrying access indication information, where the access indication information is used for indicating whether to allow access of first type user equipment, a maximum operating bandwidth of the first type user equipment is less than an operating bandwidth of second type user equipment.

The first type user equipment may include, but is not limited to, a reduced capability NR device in a 3GPP Release 17 protocol. The second type user equipment may be eMBB user equipment. The maximum bandwidth supported by the first type user equipment is less than the minimum bandwidth supported by the user equipment as required by eMBB. For example, the maximum bandwidth supported by the first type user equipment is less than the operating bandwidth (e.g., 100M) of the second type user equipment.

The base station may send the access indication information via broadcast, etc. The access indication information is used for indicating whether the access of the first type user equipment is allowed. The access indication information may be carried in existing broadcast information, for example, in information such as the PBCH information of the SSB and the like. The base station may adopt the same access rule for all frequency points, i.e., the access of the first type user equipment is not allowed at all frequency points. The base station may also adopt different access rules for all different frequency points, i.e., the access of the first type user equipment is allowed at some of the frequency points, while the access of the first type user equipment is not allowed at others of the frequency points. Here, the access may refer to the initial access of the user equipment to the base station, or the access to a neighboring cell from a serving cell, or the like.

The access indication information may be provided adopting a spare bit of the PBCH information. A redundant code point of the PBCH information may also be adopted as indication information. Here, the redundant code point may be a bit value or a bit sequence value whose meaning is not defined in the PBCH information. For example, the PBCH information includes 4 bits, where "111" is defined as certain configuration and "1110" and "1100" are not defined, then the two values "1110" and "1100" can be defined as allowing the access of the first type user equipment and not allowing the access of the first type user equipment, respectively.

The user equipment determines an access restriction of the base station according to received access indication information. If the access indication information indicates that the access of the first type user equipment is not allowed, the access will not be performed, and the search for other base stations or frequency points is continued. If the access indication information indicates that the base station allows the access of the first type user equipment, the access will be performed.

Since the bandwidth of the reduced capability NR device is different from that of the eMBB user equipment and it may increase the complexity of base station configuration for the base station to support the reduced capability NR device, usually the base station does not configure with the bandwidth of the reduced capability NR device. Therefore, for the base station that does not configure with the bandwidth of the reduced capability NR device, the access indication information can be carried in the PBCH information, reducing access attempts of the reduced capability NR device. In the base station configured with the bandwidth of the reduced capability NR device, in order to allocate resources reasonably, the access of the reduced capability NR device may not be allowed to allocate the resources centrally to the eMBB user equipment in the case of insufficient resources.

The base station may determine whether the access of the first type user equipment is allowed according to its own bandwidth configuration. When the base station is configured with the bandwidth supported by the first type user equipment, the access of the first type user equipment may be allowed. When the base station is not configured with the bandwidth supported by the first type user equipment, the access indication information may be configured to indicate that the access of the first type user equipment is not allowed. Here, the bandwidth configuration may include the communication bandwidth after the user equipment has been accessed.

The base station may also determine whether the access of the first type user equipment is allowed combining its own communication load or other status. When the base station is configured with the bandwidth supported by the first type user equipment and the communication load of the base station is less than or equal to a predetermined threshold, the base station may configure the access indication information to indicate that the access of the first type user equipment is allowed. When the base station is configured with the bandwidth supported by the first type user equipment and the communication load of the base station is greater than the predetermined threshold, the base station may configure the access indication information to indicate that the access of the first type user equipment is not allowed.

In this way, on one hand, the base station indicates through the access indication information whether the first type user equipment can perform the access, which facilitates the control of types of accessed user equipment, thereby improving the compatibility of the base station to different user equipment; on the other hand, the first type user equipment can determine whether the access is possible before attempting to perform access according to this explicit indication information, reducing invalid access attempts, improving communication efficiency and saving communication resources.

In some embodiments, the access indication information is carried in an idle reserved bit of an MIB field in the PBCH information.

The access indication information may be carried in the PBCH information, the base station indicates whether the access of the first type user equipment is allowed using the idle reserved bit of the MIB field in the PBCH. Here, the idle reserved bit may be a bit in the MIB field that does not have a defined meaning and is not occupied.

Figure 3:
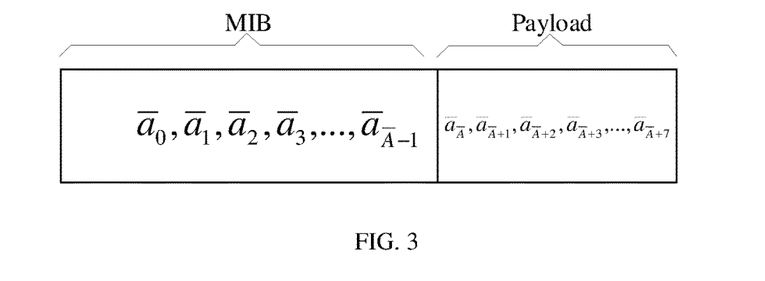
FIG. 3 is a structural schematic diagram of a PBCH information frame illustrated according to some embodiments.

In the structural schematic diagram of the PBCH information frame as shown in FIG. 3, the access indication information may be provided in the idle reserved bit of the MIB field of the PBCH.

For example, the base station may use one idle reserved bit in the MIB field to carry the access indication information. In this case, "0" may be used to indicate that the access of the first type user equipment is not allowed, and "1" may be used to indicate that the access of the first type user equipment is allowed. Alternatively, "1" may be used to indicate that the access of the first type user equipment is not allowed, and "0" may be used to indicate that the access of the first type user equipment is allowed.

After broadcasted PBCH information is received by the first type user equipment, the first type user equipment determines an access restriction according to the access indication information read from the idle reserved bit of the MIB field in the PBCH information. If the base station does not allow the first type user equipment to access current cell or frequency point, search for an SSB of this frequency point is stopped, i.e., the access will not be performed, and search for other frequency points is continued. If the base station allows the access of the first type user equipment, the access will be performed.

In some embodiments, the access indication information is carried in a spare bit of a payload field in the PBCH information.

The access indication information may be carried in the PBCH information, and the base station indicates whether the access of the first type user equipment is allowed using the spare bit of the payload field in the PBCH.

In the structural schematic diagram of the PBCH information frame as shown in FIG. 3, the access indication information may be provided in the spare bit of the payload field in the PBCH.

For example, the base station may use one bit in the payload field to carry the access indication information. In this case, "0" may be used to indicate that the access of the first type user equipment is not allowed, and "1" may be used to indicate that the access of the first type user equipment is allowed. Alternatively, "1" may be used to indicate that the access of the first type user equipment is not allowed, and "0" may be used to indicate that the access of the first type user equipment is allowed.

After broadcasted PBCH information is received by the first type user equipment, the first type user equipment determines an access restriction according to the access indication information read from the spare bit of the payload field in the PBCH information. If the base station does not allow the first type user equipment to access current cell or frequency point, the access will not be performed and search for other frequency points is continued. If the base station allows the access of the first type user equipment, the access will be performed. After determining that the base station does not allow the first type user equipment to access current cell or frequency point, the first type user equipment may search an SSB of other cells or frequency points and attempt to be accessed. In this way, it can be determined whether the current cell or frequency point can be accessed in the early stage of the first type user equipment parsing an SSB, reducing unnecessary access attempts.

In some embodiments, the access indication information being carried in the spare bit of the payload field in the PBCH information includes: the access indication information being carried in a lowest bit of the payload field; and/or the access indication information being carried in a second lowest bit of the payload field.

Here, as shown in FIG. 3, the lowest bit may be a bit at position "A+7" of the payload and the second lowest bit may be a bit at position "A+6" of the payload. The access indication information may be provided adopting any one of the bit at position "A+6" and the bit at position "A+7" of the payload. Alternatively, the access indication information may be provided adopting the two bits at positions "A+6" and "A+7" of the payload.

In some embodiments, the PBCH information further carries bandwidth information indicating a bandwidth for a CORESET of RMSI;

The bandwidth information and the access indication information are used together for the first type user equipment to determine whether the access is allowed.

Here, the bandwidth information for the CORESET of the RMSI in the PBCH information of the base station is used for indicating the bandwidth for the CORESET of the RMSI. The first type user equipment may determine whether the bandwidth for the CORESET of the RMSI and the bandwidth supported by the first type user equipment match according to the bandwidth information, and thus determine whether to perform the access.

The bandwidth for the CORESET of the RMSI may be the same as communication bandwidth which is after the user equipment has been accessed and is configured by the base station, or may be different from the communication bandwidth which is after the user equipment has been accessed and is configured by the base station.

The first type user equipment may determine whether to perform the access combining the bandwidth information and the access indication information. For example, the base station may configure the bandwidth for the CORESET of the RMSI in the bandwidth information to be less than or equal to the maximum bandwidth supported by the first type user equipment, such that the first type user equipment may perform the access. In the case that the communication load is relative high, the base station may indicate through the access indication information that the access of the first type user equipment is not allowed, to reduce the number of newly accessed first type user equipment, reducing the communication load.

The first type user equipment may determine whether to perform the access according to a logical processing result of indication from the bandwidth information and indication from the access indication information. Priority may be set for the indication from the bandwidth information and the indication from the access indication information and whether to perform the access is determined according to the indication with higher priority.

The base station may configure the bandwidth for the CORESET of the RMSI in the bandwidth information to be less than or equal to the maximum bandwidth supported by the first type user equipment. In this case, the access indication information is sent to explicitly indicate that the first type user equipment can be accessed. In this way, when the PBCH information is received by the first type user equipment and the first type user equipment determines whether the first type user equipment supports the bandwidth for the CORESET of the RMSI, and if it is supported and the access indication information indicates that the first type user equipment can be accessed, the access will be performed.

The base station may configure the bandwidth for the CORESET of the RMSI in the bandwidth information to be larger than the maximum bandwidth supported by the first type user equipment, such that the first type user equipment cannot receive the CORESET of the RMSI, implicitly indicating that the first type user equipment cannot be accessed. In this case, no matter whether the access indication information indicates that the access of the first type user equipment is allowed, the first type user equipment cannot be accessed.

The base station and the user equipment may agree that indication from the access indication information has a higher priority. When the bandwidth information implicitly indicates that the first type user equipment can be accessed, but the access indication information indicates the access of the first type user equipment is not allowed, since the access indication information has the higher priority, the user equipment will not perform the access.

Figure 4:
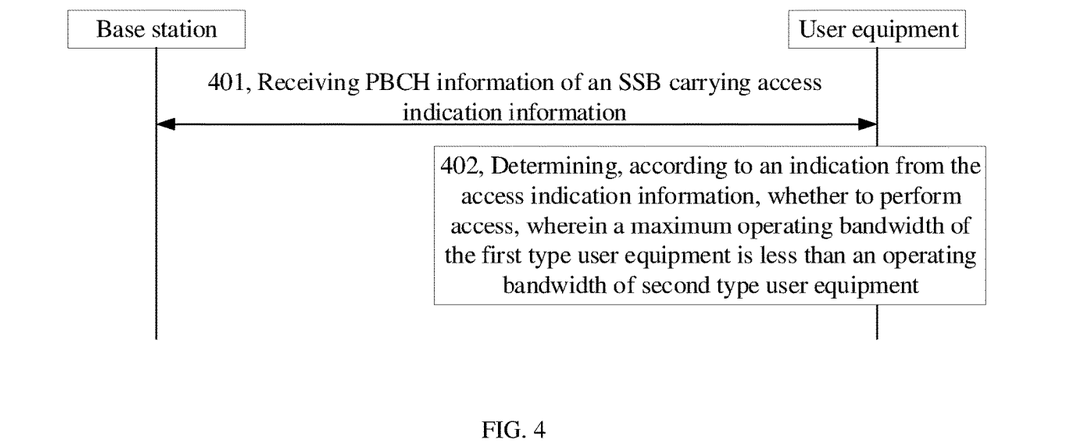
FIG. 4 is a schematic flow chart of another access control method illustrated according to some embodiments.

As shown in FIG. 4, an access control method is provided by the present embodiment and can be applied to the first type user equipment in the wireless communication. The access control method may include the following steps.

Step 401, receiving PBCH information of an SSB carrying access indication information.

Step 402, determining, according to an indication from the access indication information, whether to perform access, where a maximum operating bandwidth of the first type user equipment is less than an operating bandwidth of second type user equipment.

The first type user equipment may include, but is not limited to, a reduced capability NR device in a 3GPP Release 17 protocol. The second type user equipment may be eMBB user equipment. The maximum bandwidth supported by the first type user equipment is less than the minimum bandwidth supported by the user equipment as required by eMBB. For example, the maximum bandwidth supported by the first type user equipment is less than the operating bandwidth (e.g., 100M) of the second type user equipment.

The base station may send the access indication information via broadcast, etc. The access indication information is used for indicating whether the access of the first type user equipment is allowed. The access indication information may be carried in existing broadcast information, for example, in information such as the PBCH information of the SSB and the like. The base station may adopt the same access rule for all frequency points, i.e., the access of the first type user equipment is not allowed at all frequency points. The base station may also adopt different access rules for all different frequency points, i.e., the access of the first type user equipment is allowed at some of the frequency points, while the access of the first type user equipment is not allowed at others of the frequency points. Here, the access may refer to initial access of the user equipment to the base station, or the access to a neighboring cell from a serving cell, or the like.

The access indication information may be provided adopting a spare bit of the PBCH information. A redundant code point of the PBCH information may also be adopted as indication information. Here, the redundant code point may be a bit value or a bit sequence value whose meaning is not defined in the PBCH information. For example, the PBCH information includes 4 bits, where "1111" is defined as certain configuration and "1110" and "1100" are not defined, then the two values "1110" and "1100" can be defined as allowing the access of the first type user equipment and not allowing the access of the first type user equipment, respectively.

The user equipment determines an access restriction of the base station according to received access indication information. If the access indication information indicates that the base station does not allow the first type user equipment to access the current cell or frequency point, the access will not be performed, and the search for other base stations or frequency points is continued. If the access indication information indicates that the base station allows the access of the first type user equipment, the access will be performed.

Since the bandwidth of the reduced capability NR device is different from that of eMBB user equipment and it may increase the complexity of base station configuration for the base station to support the reduced capability NR device, usually the base station does not configure with the bandwidth of the reduced capability NR device. Therefore, for the base station that does not configure with the bandwidth of the reduced capability NR device, the access indication information can be carried in the PBCH information, reducing access attempts of the reduced capability NR device. In the base station configured with the bandwidth of the reduced capability NR device, in order to allocate resources reasonably, the access of the reduced capability NR device may not be allowed to allocate the resources centrally to the eMBB user equipment in the case of insufficient resources.

The base station may determine whether the access of the first type user equipment is allowed according to its own bandwidth configuration. When the base station is configured with the bandwidth supported by the first type user equipment, the access of the first type user equipment may be allowed. When the base station is not configured with the bandwidth supported by the first type user equipment, the access indication information may be configured to indicate that the access of the first type user equipment is not allowed. Here, the bandwidth configuration may include the communication bandwidth after the user equipment has been accessed.

The base station may also determine whether the access of the first type user equipment is allowed combining its own communication load or other status. When the base station is configured with the bandwidth supported by the first type user equipment and the communication load of the base station is less than or equal to a predetermined threshold, the base station may configure the access indication information to indicate that the access of the first type user equipment is allowed. When the base station is configured with the bandwidth supported by the first type user equipment and the communication load of the base station is greater than the predetermined threshold, the base station may configure the access indication information to indicate that the access of the first type user equipment is not allowed.

In this way, on one hand, the base station indicates through the access indication information whether the first type user equipment can perform the access, which facilitates the control of types of accessed user equipment, thereby improving the compatibility of the base station to different user equipment; on the other hand, the first type user equipment can determine whether the access is possible before attempting to perform access according to this explicit indication information, reducing invalid access attempts, improving communication efficiency and saving communication resources.

In some embodiments, the step 402 may include: determining, in response to the access indication information indicating that access of the first type user equipment is allowed, to perform the access.

The user equipment determines an access restriction of the base station according to received access indication information. If the access indication information indicates that the base station allows the access of the first type user equipment, the access will be performed.

In some embodiments, the step 402 may include: determining, in response to the access indication information indicating that access of the first type user equipment is not allowed, not to perform the access.

The user equipment determines an access restriction of the base station according to received access indication information. If the access indication information indicates that the base station does not allow the first type user equipment to access the current cell or frequency point, the access will not be performed, and the search for other cells or frequency points is continued.

In some embodiments, the access control method may further includes: searching an SSB of a first frequency point, where the first frequency point is different from a second frequency point where the first type user equipment is currently in.

After determining that the base station does not allow the first type user equipment to access the current cell or frequency point, the first type user equipment may search an SSB of other cells or frequency points and attempt to perform access. In this way, it can be determined whether the current cell or frequency point can be accessed in the early stage of the first type user equipment parsing the SSB, reducing unnecessary access attempts.

In some embodiments, the access indication information is carried in an idle reserved bit of an MIB field in the PBCH information.

The access indication information may be carried in the PBCH information, and the base station indicates whether the access of the first type user equipment is allowed using the idle reserved bit of the MIB field in the PBCH information.

In the structural schematic diagram of the PBCH information frame as shown in FIG. 3, the access indication information may be provided in the idle reserved bit of the MIB field of the PBCH. Here, the idle reserved bit may be a bit in the MIB field whose meaning is not defined and which is not occupied.

For example, the base station may use one idle reserved bit in the MIB field to carry the access indication information. In this case, "0" may be used to indicate that the access of the first type user equipment is not allowed, and "1" may be used to indicate that the access of the first type user equipment is allowed. Alternatively, "1" may be used to indicate that the access of the first type user equipment is not allowed, and "0" may be used to indicate that the access of the first type user equipment is allowed.

After broadcasted PBCH information is received by the first type user equipment, the first type user equipment determines an access restriction according to the access indication information read from the idle reserved bit of the MIB field in the PBCH information. If the base station does not allow the first type user equipment to access current cell or frequency point, search for an SSB of this frequency point is stopped, i.e., the access will not be performed, and search for other frequency points is continued. If the base station allows the access of the first type user equipment, the access will be performed.

In some embodiments, the access indication information is carried in a spare bit of a payload field in the PBCH information.

The access indication information may be carried in the PBCH information, and the base station indicates whether the access of the first type user equipment is allowed using the spare bit of the payload field in the PBCH.

In the structural schematic diagram of the PBCH information frame as shown in FIG. 3, the access indication information may be provided in the spare bit of the payload field in the PBCH.

For example, the base station may use one bit in the payload field to carry the access indication information. In this case, "0" may be used to indicate that the access of the first type user equipment is not allowed, and "1" may be used to indicate that the access of the first type user equipment is allowed. Alternatively, "1" may be used to indicate that the access of the first type user equipment is not allowed, and "0" may be used to indicate that the access of the first type user equipment is allowed.

After broadcasted PBCH information is received by the first type user equipment, the first type user equipment determines an access restriction according to the access indication information read from the spare bit of the payload field in the PBCH information. If the base station does not allow the access of the first type user equipment, the access will not be performed and search for other frequency points is continued. If the base station allows the access of the first type user equipment, the access w % ill be performed.

In some embodiments, the access indication information being carried in the spare bit of the payload field in the PBCH information includes, the access indication information being carried in a lowest bit of the payload field; and/or the access indication information being carried in a second lowest bit of the payload field.

Here, as shown in FIG. 3, the lowest bit may be a bit at position "A+7" of the payload and the second lowest bit may be a bit at position "A+6" of the payload. The access indication information may be provided adopting any one of the bit at position "A+6" and the bit at position "A+7" of the payload. Alternatively, the access indication information may be provided adopting the two bits at positions "A+6" and "A+7" of the payload.

In some embodiments, the PBCH information carries bandwidth information indicating a bandwidth for a CORESET of RMSI. The step 402 may include: determining whether to perform the access combining the access indication information and the bandwidth information.

Here, the bandwidth information for the CORESET of the RMSI in the PBCH information of the base station is used for indicating the bandwidth for the CORESET of the RMSI. The first type user equipment may determine whether the bandwidth for the CORESET of the RMSI and the bandwidth supported by the first type user equipment match according to the bandwidth information, and thus determines whether to perform the access.

The bandwidth for the CORESET of the RMSI may be the same as communication bandwidth which is after the user equipment has been accessed and is configured by the base station, or may be different from communication bandwidth which is after the user equipment has been accessed and is configured by the base station.

The first type user equipment may determine whether to perform the access combining the bandwidth information and the access indication information. For example, the base station may configure the bandwidth for the CORESET of the RMSI in the bandwidth information to be less than or equal to the maximum bandwidth supported by the first type user equipment, such that the first type user equipment may perform the access. In the case that the communication load is relative high, the base station may indicate through the access indication information that the access of the first type user equipment is not allowed to reduce the number of newly accessed first type user equipment, reducing the communication load.

In some embodiments, determining whether to perform the access combining the bandwidth information and the access indication information includes one of: determining, in response to the first type user equipment supporting the bandwidth indicated by the bandwidth information and the access indication information indicating that the access of the first type user equipment is allowed, to perform the access; determining, in response to the first type user equipment supporting the bandwidth indicated by the bandwidth information and the access indication information indicating that the access of the first type user equipment is not allowed, not to perform the access; determining, in response to the first type user equipment not supporting the bandwidth indicated by the bandwidth information and the access indication information indicating that the access of the first type user equipment is allowed, not to perform the access; and determining, in response to the first type user equipment not supporting the bandwidth indicated by the bandwidth information and the access indication information indicating that the access of the first type user equipment is not allowed, not to perform the access.

The first type user equipment may determine whether to perform the access according to a logical processing result of indication from the bandwidth information and indication from the access indication information. Priority may be set for the indication from the bandwidth information and indication from the access indication information and whether to perform the access is determined according to the indication with higher priority.

The base station may configure the bandwidth for the CORESET of the RMSI in the bandwidth information to be less than or equal to the maximum bandwidth supported by the first type user equipment. In this case, the access indication information is sent to explicitly indicate that the first type user equipment can be accessed. In this way, when the PBCH information is received by the first type user equipment and the first type user equipment determines whether the first type user equipment supports the bandwidth for the CORESET of the RMSI, if it is supported and the access indication information indicates that the first type user equipment can be accessed, the access will be performed.

The base station may configure the bandwidth for the CORESET of the RMSI in the bandwidth information to be larger than the maximum bandwidth supported by the first type user equipment, such that the first type user equipment cannot receive the CORESET of the RMSI, implicitly indicating that the first type user equipment cannot be accessed. In this case, no matter whether the access indication information indicates that the access of the first type user equipment is allowed, the first type user equipment cannot perform the access.

The base station and the user equipment may agree that the indication from the access indication information has a higher priority. When the bandwidth information implicitly indicates that the first type user equipment can be accessed, but the access indication information indicates that the access of the first type user equipment is not allowed, since the access indication information has the higher priority, the user equipment will not perform the access.

One specific example is provided below combining any foregoing embodiment.

The method for indicating the reduced capability NR device (REDCAP UE) by the base station includes, but is not limited to, the following two approaches.

Approach 1, occupying an idle reserved bit.

The base station adopts the idle reserved bit in the PBCH, where the access of the reduced capability NR device is allowed when the idle reserved bit is configured as "0", and the access of the reduced capability NR device is not allowed when the idle reserved bit is "1"; or the access of the reduced capability NR device is allowed when the idle reserved bit is configured as "1", and the access of the reduced capability NR device is not allowed when the idle reserved bit is "0".

The user equipment determines an access restriction according to information read from the idle reserved bit in PBCH. If the base station does not allow the first type user equipment to access current cell or frequency point, search for an SSB of this frequency point is stopped, and search for other frequency points is continued. If the access is allowed, an initial access procedure is continued.

Approach 2, adopting a reserved bit which is at one of the following positions in the PBCH: "A+6", "A+7", and "A+6" and "A+7" for FRI.

The user equipment determines an access restriction according to the reserved bit in read PBCH. If the access is not allowed, search for other frequency points is continued. If the access is allowed, the initial access procedure is continued.

The method for indicating the reduced capability NR device by the base station further includes: assuming that the maximum bandwidth supported by the reduced capability NR device is n, then it may be implicitly indicated by the base station configuring the bandwidth of the RMSI CORESET to exceed this value, i.e., configuring the bandwidth of the RMSI CORESET to be m, where m>n. If the base station is configured with bandwidth suitable for the reduced capability NR device to be accessed, the base station may explicitly inform whether to restrict the reduced capability NR device to be accessed through explicit indications such as an idle reserved bit and the like.

Figure 5:
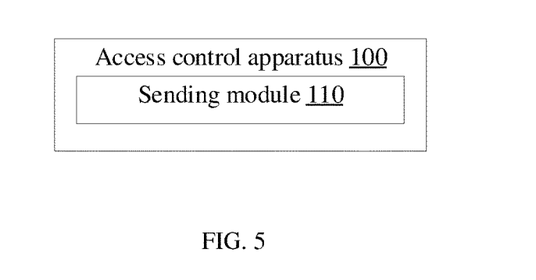
FIG. 5 is a compositional and structural block diagram of an access control apparatus illustrated according to some embodiments.

An access control apparatus is also provided by the embodiments of the present disclosure, and is applied to the base station of the wireless communication. FIG. 5 is the compositional and structural schematic diagram of the access control apparatus 100 provided by the embodiments of the present disclosure. As shown in FIG. 5, the apparatus 100 includes: a sending module 110. The sending module 110 is configured to send PBCH information of an SSB carrying access indication information, where the access indication information is used for indicating whether to allow access of the first type user equipment, a maximum operating bandwidth of the first type user equipment being less than an operating bandwidth of second type user equipment.

In some embodiments, the access indication information is carried in an idle reserved bit of an MIB field in the PBCH information.

In some embodiments, the access indication information is carried in a spare bit of a payload field in the PBCH information.

In some embodiments, the access indication information being carried in the spare bit of the payload domain in the PBCH information includes: the access indication information being carried in a lowest bit of the payload field; and/or the access indication information being carried in a second lowest bit of the payload field.

In some embodiments, the PBCH information further carries bandwidth information indicating a bandwidth for a CORESET of RMSI. The bandwidth information and the access indication information are used together for the first type user equipment to determine whether the access is allowed.

Figure 6:
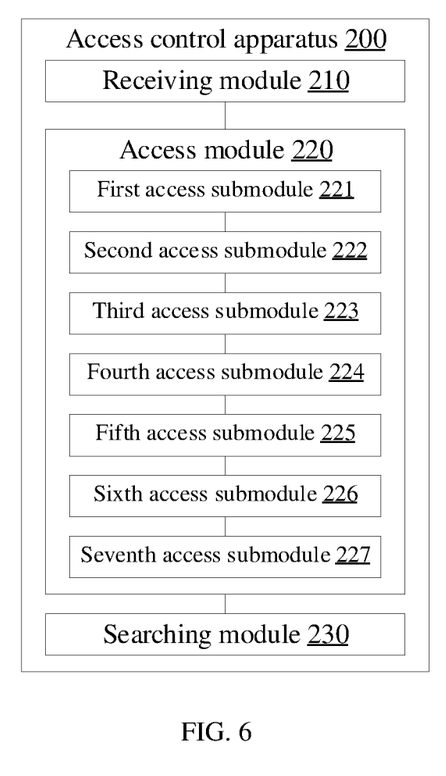
FIG. 6 is a compositional and structural block diagram of another access control apparatus illustrated according to some embodiments.

An access control apparatus is also provided by the embodiments of the present disclosure, and is applied to the first type user equipment of the wireless communication. FIG. 6 is the compositional and structural diagram of the access control apparatus 200 provided by the embodiments of the present disclosure. As shown in FIG. 6, the apparatus 200 includes: a receiving module 210 and an access module 220.

The receiving module 210 is configured to receive PBCH information of an SSB carrying access indication information; and The access module 220 is configured to determine, according to an indication from the access indication information, whether to perform access, where a maximum operating bandwidth of the first type user equipment is less than an operating bandwidth of second type user equipment.

In some embodiments, the access module 220 includes: a first access submodule 221 configured to determine, in response to the access indication information indicating that access of the first type user equipment is allowed, to perform the access.

In some embodiments, the access module 220 includes: a second access submodule 222 configured to determine, in response to the access indication information indicating that access of the first type user equipment is not allowed, not to perform the access.

In some embodiments, the apparatus 200 further includes: a searching module 230 configured to search an SSB of a first frequency point, where the first frequency point is different from a second frequency point where the first type user equipment is currently in.

In some embodiments, the access indication information is carried in an idle reserved bit of an MIB field in the PBCH information.

In some embodiments, the access indication information is carried in a spare bit of a payload field in the PBCH information.

In some embodiments, the access indication information being carried in the spare bit of the payload field in the PBCH information, includes: the access indication information being carried in a lowest bit of the payload field; and/or the access indication information being carried in a second lowest bit of the payload field.

In some embodiments, the PBCH information carries bandwidth information indicating a bandwidth for a CORE-SET of RMSI. The access module 220 includes: a third access submodule 223 configured to determine whether to perform access combining the access indication information and the bandwidth information.

In some embodiments, the access module 220 includes one of: a fourth access submodule 224 configured to determine, in response to the first type user equipment supporting the bandwidth indicated by the bandwidth information and the access indication information indicating that access of the first type user equipment is allowed, to perform the access; a fifth access submodule 225 configured to determine, in response to the first type user equipment supporting the bandwidth indicated by the bandwidth information and the access indication information indicating that the access of the first type user equipment is not allowed, not to perform the access; a sixth access submodule 226 configured to determine, in response to the first type user equipment not supporting the bandwidth indicated by the bandwidth information and the access indication information indicating that the access of the first type user equipment is allowed, not to perform the access; and a seventh access submodule 227 configured to determine, in response to the first type user equipment not supporting the bandwidth indicated by the bandwidth information and the access indication information indicating that the access of the first type user equipment is not allowed, not to perform the access.

In some embodiments, the sending module 110, the receiving module 210, the access module 220, the searching module 230 and the like may be implemented with one or more central processing units (CPUs), graphics processing units (GPUs), baseband processors (BPs), application specific integrated circuits (ASICs), DSPs, programmable logic devices (PLDs), complex programmable logic devices (CPLDs), field-programmable gate arrays (FPGAs), general processors, controllers, micro controller units (MCUs), microprocessors or other electronic elements, for performing the foregoing methods.

Figure 7:
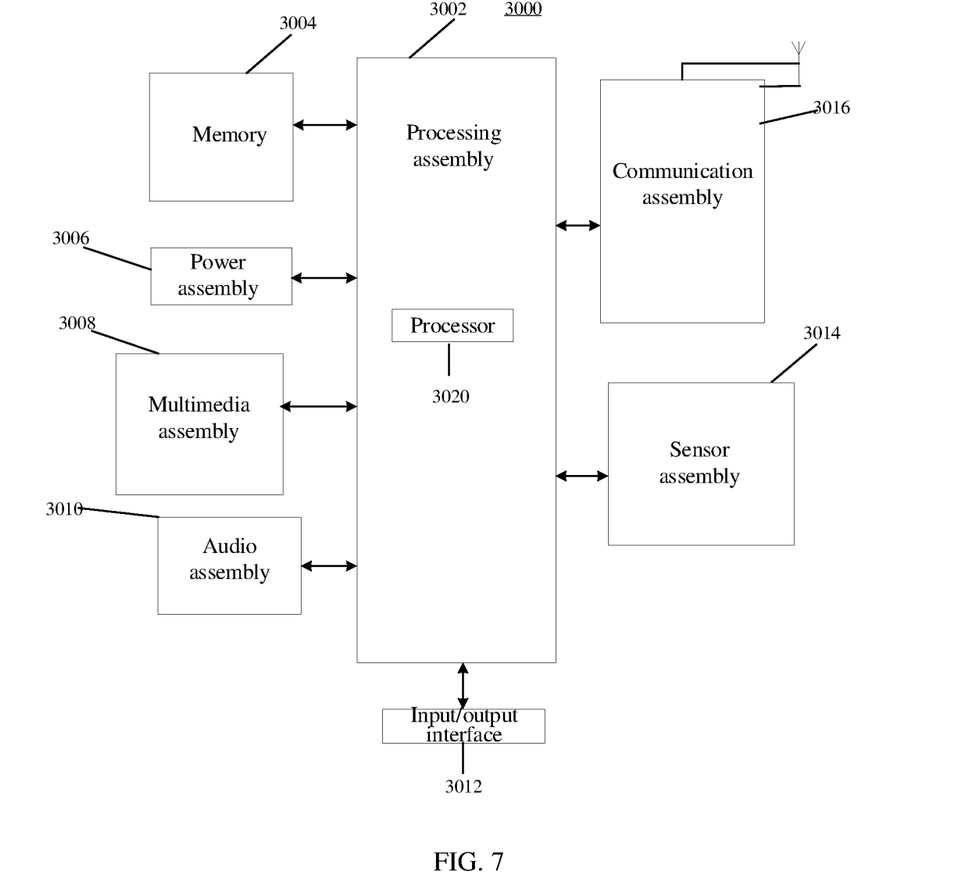
FIG. 7 is a block diagram of a device for access control illustrated according to some embodiments.

FIG. 7 is a block diagram of a device 3000 for access control according to some embodiments. For example, the apparatus 3000 may be a mobile telephone, a computer, a digital broadcast terminal, a messaging device, a gaming console, a tablet, a medical device, exercise equipment, a personal digital assistant, and the like.

Referring to FIG. 7, the apparatus 3000 may include one or more of the following assemblies: a processing assembly 3002, a memory 3004, a power assembly 3006, a multimedia assembly 3008, an audio assembly 3010, an input/output (I/O) interface 3012, a sensor assembly 3014, and a communication assembly 3016.

The processing assembly 3002 typically controls overall operations of the apparatus 3000, such as the operations associated with display, telephone calls, data communications, camera operations, and recording operations. The processing assembly 3002 may include one or more processor 3020 to execute instructions to perform all or part of the steps in the foregoing methods. Moreover, the processing assembly 3002 may include one or more modules, facilitating the interaction between the processing assembly 3002 and other assemblies. For instance, the processing assembly 3002 may include a multimedia module to facilitate the interaction between the multimedia assembly 3008 and the processing assembly 3002.

The memory 3004 is configured to store various types of data to support the operation of the device 3000. Examples of such data include instructions for any applications or methods operated on the device 3000, contact data, phonebook data, messages, pictures, video, etc. The memory 3004 may be implemented using any type of volatile or nonvolatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power assembly 3006 provides power to various assemblies of the apparatus 3000. The power assembly 3006 may include a power management system, one or more power sources, and any other assemblies associated with the generation, management, and distribution of power in the device 3000.

The multimedia assembly 3008 includes a screen providing an output interface between the device 3000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia assembly 3008 includes a front camera and/or a rear camera. The front camera and/or the rear camera may receive an external multimedia datum while the device 3000 is in an operation mode, such as a photographing mode or a video mode. Each of the front camera and the rear camera may be a fixed optical lens system or have focus and optical zoom capability.

The audio assembly 3010 is configured to output and/or input audio signals. For example, the audio assembly 3010 includes a microphone (MIC) configured to receive an external audio signal when the device 3000 is in an operation mode, such as a call mode, a recording mode, and a voice recognition mode. The received audio signal may be further stored in the memory 3004 or transmitted via the communication assembly 3016. In some embodiments, the audio assembly 3010 further includes a speaker to output audio signals.

The I/O interface 3012 provides an interface between the processing assembly 3002 and peripheral interface modules, such as a keyboard, a click wheel, buttons, and the like. The buttons may include, but are not limited to, a home button, a volume button, a starting button, and a locking button.

The sensor assembly 3014 includes one or more sensors to provide status assessments of various aspects of the device 3000. For instance, the sensor assembly 3014 may detect an open/closed status of the apparatus 3000, relative positioning of assemblies, e.g., the display and the keypad, of the device 3000, a change in position of the device 3000 or an assembly of the device 3000, a presence or absence of user contact with the device 3000, an orientation or an acceleration/deceleration of the device 3000, and a change in temperature of the device 3000. The sensor assembly 3014 may include a proximity sensor configured to detect the presence of nearby objects without any physical contact. The sensor assembly 3014 may also include a light sensor, such as a CMOS or CCD image sensor, for use in imaging applications. In some embodiments, the sensor assembly 3014 may also include an accelerometer sensor, a gyroscope sensor, a magnetic sensor, a pressure sensor, or a temperature sensor.

The communication assembly 3016 is configured to facilitate communication, wired or wirelessly, between the device 3000 and other devices. The device 3000 can access a wireless network based on a communication standard, such as WiFi, 2G, 3G, 4G, or 5G or a combination thereof. In some embodiments, the communication assembly 3016 receives a broadcast signal or broadcast associated information from an external broadcast management system via a broadcast channel. In some embodiments, the communication assembly 3016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the device 3000 may be implemented with one or more application specific integrated circuits (ASICs), digital signal processors (DSPs), digital signal processing devices (DSPDs), programmable logic devices (PLDs), field-programmable gate arrays (FPGAs), controllers, micro controllers, microprocessors, or other electronic elements, for performing the foregoing methods.

In some embodiments, there is also provided a non-transitory computer readable storage medium including instructions, such as included in the memory 3004, executable by the processor 3020 in the device 3000, for performing the foregoing methods. For example, the non-transitory computer readable storage medium may be a ROM, a random access memory (RAM), a CD-ROM, a magnetic tape, a floppy disc, an optical data storage device, and the like.

Other embodiments of the present disclosure will be apparent to those skilled in the art from consideration of the description and practice of the disclosure disclosed here. This application is intended to cover any variations, uses, or adaptations of the embodiments of the present disclosure following the general principles thereof and including known or customary practice in the art not disclosed in the embodiments of the present disclosure. It is intended that the description and the embodiments be considered as exemplary only, with a true scope and spirit of the disclosure being indicated by the following claims.

It is appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. An access control method, comprising:
    sending, by a base station, physical broadcast channel (PBCH) information of a synchronization signal block (SSB) carrying access indication information, wherein
    the access indication information indicates whether to allow access of first type user equipment, a maximum operating bandwidth of the first type user equipment being less than an operating bandwidth of second type user equipment,
    the access indication information is carried in a spare bit of a payload field in the PBCH information, and the PBCH information further carries bandwidth information indicating a bandwidth for a common control resource set (CORESET) of Remaining Minimum System Information (RMSI), and
    an indication from the bandwidth information is configured for the first type user equipment to determine whether the access is allowed.

2. The method according to claim 1, wherein the access indication information being carried in the spare bit of the payload field in the PBCH information, comprises at least one of:
    the access indication information being carried in a lowest bit of the payload field; or
    the access indication information being carried in a second lowest bit of the payload field.

3. The method according to claim 1, wherein
    the bandwidth information and the access indication information are used together for the first type user equipment to determine whether the access is allowed.

4. An access control method, comprising:
    receiving, by first type user equipment, physical broadcast channel (PBCH) information of a synchronization signal block (SSB) carrying access indication information; and
    determining, by the first type user equipment according to an indication from the access indication information, whether to perform access, wherein
    a maximum operating bandwidth of the first type user equipment is less than an operating bandwidth of second type user equipment,
    the access indication information is carried in a spare bit of a payload field in the PBCH information, and the PBCH information further carries bandwidth information indicating a bandwidth for a common control resource set (CORESET) of Remaining Minimum System Information (RMSI), and
    an indication from the bandwidth information is configured for the first type user equipment to determine whether the access is allowed.

5. The method according to claim 4, wherein determining whether to perform the access according to the indication from the access indication information, comprises:
    determining, in response to the access indication information indicating that access of the first type user equipment is allowed, to perform the access.

6. The method according to claim 4, wherein determining whether to perform the access according to the indication from the access indication information, comprises:
    determining, in response to the access indication information indicating that access of the first type user equipment is not allowed, not to perform the access.

7. The method according to claim 6, further comprising:
searching an SSB of a first frequency point, wherein the first frequency point is different from a second frequency point where the first type user equipment is currently in.

8. The method according to claim 4, wherein the access indication information being carried in the spare bit of the payload field in the PBCH information, comprises at least one of:
the access indication information being carried in a lowest bit of the payload field; or
the access indication information being carried in a second lowest bit of the payload field.

9. The method according to claim 4,
wherein determining whether to perform the access according to the indication from the access indication information, comprises:
determining whether to perform the access combining the access indication information and the bandwidth information.

10. The method according to claim 9, wherein determining whether to perform the access combining the access indication information and the bandwidth information, comprises one of:
determining, in response to the first type user equipment supporting the bandwidth indicated by the bandwidth information and the access indication information indicating that access of the first type user equipment is allowed, to perform the access;
determining, in response to the first type user equipment supporting the bandwidth indicated by the bandwidth information and the access indication information indicating that the access of the first type user equipment is not allowed, not to perform the access;
determining, in response to the first type user equipment not supporting the bandwidth indicated by the bandwidth information and the access indication information indicating that the access of the first type user equipment is allowed, not to perform the access; and
determining, in response to the first type user equipment not supporting the bandwidth indicated by the bandwidth information and the access indication information indicating that the access of the first type user equipment is not allowed, not to perform the access.

11. A communication device comprising:
a processor;
a transceiver; and
a memory storing instructions executable by the processor,
wherein the processor is configured to:
send physical broadcast channel (PBCH) information of a synchronization signal block (SSB) carrying access indication information, wherein
the access indication information indicates whether to allow access of first type user equipment, a maximum operating bandwidth of the first type user equipment being less than an operating bandwidth of second type user equipment,
the access indication information is carried in a spare bit of a payload field in the PBCH information, and the PBCH information further carries bandwidth information indicating a bandwidth for a common control resource set (CORESET) of Remaining Minimum System Information (RMSI), and
an indication from the bandwidth information is configured for the first type user equipment to determine whether the access is allowed.

12. The communication device according to claim 11, wherein the access indication information being carried in the spare bit of the payload field in the PBCH information, comprises at least one of:
the access indication information being carried in a lowest bit of the payload field; or
the access indication information being carried in a second lowest bit of the payload field.

13. The communication device according to claim 11, wherein
the bandwidth information and the access indication information are used together for the first type user equipment to determine whether the access is allowed.

* * * * *